United States Patent
Nagel et al.

(10) Patent No.: US 10,078,673 B2
(45) Date of Patent: Sep. 18, 2018

(54) DETERMINING GRAPHICAL ELEMENTS ASSOCIATED WITH TEXT

(71) Applicant: Google Inc., Mountain View, CA (US)

(72) Inventors: Jens Nagel, Sunnyvale, CA (US); Alexa Greenberg, San Francisco, CA (US); Christian Paul Charsagua, Oakland, CA (US)

(73) Assignee: Google LLC, Mountain View, CA (US)

( * ) Notice: Subject to any disclaimer, the term of this patent is extended or adjusted under 35 U.S.C. 154(b) by 166 days.

(21) Appl. No.: 15/134,323

(22) Filed: Apr. 20, 2016

(65) Prior Publication Data

US 2017/0308587 A1    Oct. 26, 2017

(51) Int. Cl.
| | |
|---|---|
| G06F 17/24 | (2006.01) |
| G06F 17/30 | (2006.01) |
| G06F 3/0488 | (2013.01) |
| G06F 3/0484 | (2013.01) |
| G06F 3/0482 | (2013.01) |
| G06F 3/0481 | (2013.01) |
| G06F 3/0489 | (2013.01) |
| G06F 17/27 | (2006.01) |

(52) U.S. Cl.
CPC ...... *G06F 17/30554* (2013.01); *G06F 3/0482* (2013.01); *G06F 3/04817* (2013.01); *G06F 3/04842* (2013.01); *G06F 3/04886* (2013.01); *G06F 3/04895* (2013.01); *G06F 17/24* (2013.01); *G06F 17/274* (2013.01); *G06F 17/3053* (2013.01); *G06F 17/30601* (2013.01); *G06F 17/30973* (2013.01)

(58) Field of Classification Search
None
See application file for complete search history.

(56) References Cited

U.S. PATENT DOCUMENTS

| | | | |
|---|---|---|---|
| 6,104,397 A | 8/2000 | Ryan et al. | |
| 7,599,847 B2 | 10/2009 | Block et al. | |
| 8,370,143 B1 * | 2/2013 | Coker | G06F 17/276 704/240 |
| 8,484,573 B1 | 7/2013 | Zhai et al. | |
| 8,621,379 B2 | 12/2013 | Davydov | |
| 8,650,210 B1 | 2/2014 | Cheng et al. | |

(Continued)

FOREIGN PATENT DOCUMENTS

EP    2940605 A1    11/2015

OTHER PUBLICATIONS

U.S. Appl. No. 15/289,661, by Jing Cao, filed Oct. 10, 2016.

(Continued)

*Primary Examiner* — Asher D Kells
(74) *Attorney, Agent, or Firm* — Shumaker & Sieffert, P.A.

(57) ABSTRACT

A computing device is described that includes at least one processor and a memory including instructions that when executed cause the at least one processor to output for display a graphical keyboard comprising a plurality of keys, determine, based on an indication of a selection of one or more keys from the plurality of keys, inputted, determine, based on the inputted text, an information category associated with the inputted text, determine, based on the information category, a graphical symbol associated with the information category, and output, for display, the graphical symbol in a suggestion region of the graphical keyboard.

19 Claims, 7 Drawing Sheets

(56) References Cited

U.S. PATENT DOCUMENTS

| | | | |
|---|---|---|---|
| 8,706,750 B2 | 4/2014 | Hansson et al. | |
| 8,745,018 B1 | 6/2014 | Singleton et al. | |
| 8,789,144 B2 | 7/2014 | Mazzaferri et al. | |
| 8,914,451 B2 | 12/2014 | Langlois et al. | |
| 9,043,196 B1 | 5/2015 | Leydon et al. | |
| 9,086,775 B1 | 7/2015 | Tse et al. | |
| 9,462,633 B2 | 10/2016 | Shim et al. | |
| 9,483,175 B2 | 11/2016 | Wagner | |
| 9,720,955 B1 | 8/2017 | Cao et al. | |
| 2005/0234883 A1* | 10/2005 | Szeto | G06F 17/30985 |
| 2006/0048076 A1 | 3/2006 | Vronay et al. | |
| 2006/0294189 A1* | 12/2006 | Natarajan | G06F 17/30864 |
| | | | 709/206 |
| 2007/0088686 A1 | 4/2007 | Hurst-Hiller et al. | |
| 2007/0130276 A1 | 6/2007 | Zhang et al. | |
| 2007/0300177 A1 | 12/2007 | Karas et al. | |
| 2008/0021884 A1 | 1/2008 | Jones et al. | |
| 2008/0122796 A1 | 5/2008 | Jobs et al. | |
| 2008/0201434 A1 | 8/2008 | Holmes et al. | |
| 2008/0244446 A1 | 10/2008 | LeFavre et al. | |
| 2009/0006543 A1 | 1/2009 | Smit | |
| 2010/0277424 A1 | 11/2010 | Chang et al. | |
| 2010/0299594 A1 | 11/2010 | Zalewski et al. | |
| 2010/0325100 A1 | 12/2010 | Forstall et al. | |
| 2011/0087990 A1 | 4/2011 | Ng et al. | |
| 2011/0112824 A1* | 5/2011 | Sayers | G06F 17/27 |
| | | | 704/9 |
| 2011/0191321 A1 | 8/2011 | Gade et al. | |
| 2011/0191364 A1* | 8/2011 | LeBeau | G06F 17/30672 |
| | | | 707/767 |
| 2011/0201387 A1 | 8/2011 | Paek et al. | |
| 2011/0221678 A1 | 9/2011 | Davydov et al. | |
| 2012/0036469 A1 | 2/2012 | Suraqui | |
| 2012/0102549 A1 | 4/2012 | Mazzaferri et al. | |
| 2012/0124071 A1 | 5/2012 | Gebhard et al. | |
| 2012/0124519 A1 | 5/2012 | Uphoff et al. | |
| 2012/0127083 A1 | 5/2012 | Kushler et al. | |
| 2012/0158644 A1 | 6/2012 | Mital et al. | |
| 2012/0158732 A1 | 6/2012 | Mital et al. | |
| 2012/0254227 A1 | 10/2012 | Heck et al. | |
| 2012/0256840 A1 | 10/2012 | Razzaghi | |
| 2013/0018913 A1 | 1/2013 | Jones et al. | |
| 2013/0120267 A1 | 5/2013 | Pasquero et al. | |
| 2013/0246913 A1 | 9/2013 | McCormack et al. | |
| 2013/0285913 A1 | 10/2013 | Griffin et al. | |
| 2013/0297317 A1 | 11/2013 | Lee et al. | |
| 2013/0325844 A1 | 12/2013 | Plaisant | |
| 2014/0002363 A1 | 1/2014 | Griffin et al. | |
| 2014/0115070 A1* | 4/2014 | Virtanen | G06F 17/30038 |
| | | | 709/206 |
| 2014/0172814 A1 | 6/2014 | Yuen et al. | |
| 2014/0201676 A1 | 7/2014 | Du et al. | |
| 2014/0223372 A1 | 8/2014 | Dostie et al. | |
| 2014/0229847 A1 | 8/2014 | Park | |
| 2014/0282136 A1 | 9/2014 | Marantz et al. | |
| 2014/0282203 A1 | 9/2014 | Pasquero et al. | |
| 2014/0330769 A1 | 11/2014 | Nguyen et al. | |
| 2014/0358940 A1 | 12/2014 | Gupta et al. | |
| 2015/0006505 A1 | 1/2015 | Plakhov et al. | |
| 2015/0100537 A1 | 4/2015 | Grieves et al. | |
| 2015/0113435 A1 | 4/2015 | Phillips | |
| 2015/0121286 A1 | 4/2015 | Kim et al. | |
| 2015/0201065 A1 | 7/2015 | Shim et al. | |
| 2015/0222586 A1 | 8/2015 | Ebersman et al. | |
| 2015/0242086 A1 | 8/2015 | Mindlin | |
| 2015/0317316 A1 | 11/2015 | Ghanekar et al. | |
| 2015/0331605 A1 | 11/2015 | Park et al. | |
| 2015/0370434 A1 | 12/2015 | Kritt et al. | |
| 2016/0006856 A1* | 1/2016 | Bruno | H04M 1/72547 |
| | | | 715/809 |
| 2016/0034977 A1 | 2/2016 | Bhaowal et al. | |
| 2016/0085773 A1 | 3/2016 | Chang et al. | |
| 2016/0124926 A1 | 5/2016 | Fallah | |
| 2016/0224524 A1 | 8/2016 | Kay et al. | |
| 2016/0330150 A1* | 11/2016 | Joe | H04L 51/046 |
| 2016/0334988 A1 | 11/2016 | Kim et al. | |
| 2017/0102870 A1 | 4/2017 | Won | |
| 2017/0102871 A1 | 4/2017 | Won | |
| 2017/0308273 A1 | 10/2017 | Choi | |
| 2017/0308291 A1 | 10/2017 | Luipold | |
| 2017/0308292 A1 | 10/2017 | Choi | |
| 2017/0308586 A1 | 10/2017 | Mohsin et al. | |
| 2017/0308587 A1 | 10/2017 | Nagel et al. | |
| 2017/0310616 A1 | 10/2017 | Cao et al. | |

OTHER PUBLICATIONS

U.S. Appl. No. 15/299,027, by Ming-sang Choi, filed Oct. 20, 2016.
U.S. Appl. No. 15/332,409, by Muhammad Mohsin et al., filed Oct. 24, 2016.
Mcalone, "Slash is the best iPhone Keyboard—Business Insider," retrieved from http://www.businessinsider.com/slash-is-the-best-iphone-keyboard-2015-9, Sep. 22, 2015, 26 pp.
U.S. Appl. No. 15/332,513, by Heather Luipold, filed Oct. 24, 2016.
International Search Report and Written Opinion of International Application No. PCT/US2016/068456, dated Apr. 19, 2017, 14 pp.
Chansanchai, "Hub Keyboard app from Microsoft Garage makes it easy to multitask from one mobile screen", retrieved from the Internet: <https://blogs.microsoft.com/firehose/2016/02/23/hub-keyboard-app-from-microsoft-garage-makes-it-easy-to-multitask-from-one-mobile-screen/#sm.0001ekq05s8cid6jpo52ovcbjyjie>, Feb. 23, 2016, 6 pp.
U.S. Appl. No. 15/133,291, by Jing Cao, filed Apr. 20, 2016.
U.S. Appl. No. 15/134,319, by Heather Luipold, filed Apr. 20, 2016.
U.S. Appl. No. 15/134,243, by Muhammad Mohsin, filed Apr. 20, 2016.
U.S. Appl. No. 15/134,029, by Ming-sang Choi, filed Apr. 20, 2016.
U.S. Appl. No. 15/246,091, by Nicholas Chi-Yuen Kong, filed Aug. 24, 2016.
Whitwam, "Microsoft Hub Keyboard Comes to Android With All Things Microsoft in Tow", retrieved from http://www.androidpolice.com/2016/02/23/microsoft-hub-keyboard-comes-to-android-with-all-things-microsoft-in-tow/, Feb. 23, 2016, 5 pp.
U.S. Appl. No. 15/383,753 by Alexa Greenberg et al., filed Dec. 19, 2016.
Russell-Rose et al., "How to provide autocomplete and autosuggest on the same search box at the same time,"StackExchange, accessed from http://ux.stackexchange.com/questions/40104/how-to-provide-autocomplete-and-autosuggest-on-the-same-search-box-at-the-same-t, May 25, 2013, 2 pp.
Response to Written Opinion dated Apr. 19, 2017 from International Application No. PCT/US2016/068456, dated Nov. 30, 2017, 17 pp.
Second Written Opinion of International Application No. PCT/US2016/068456, dated Mar. 2, 2018, 7 pp.
International Preliminary Report on Patentability from International Application No. PCT/US2016/068456, dated Jul. 11, 2018, 9 pp.

* cited by examiner

DETERMINING GRAPHICAL ELEMENTS ASSOCIATED WITH TEXT

BACKGROUND

Despite being able to simultaneously execute several applications, some mobile computing devices only present a graphical user interface (GUI) of a single application at a given time. Thus, in order to interact with multiple applications, a user of a mobile computing device may have to switch between multiple application GUIs. For example, a user of a mobile computing device may be required to cease entering text while composing a message in a messaging application, provide input to cause the device to toggle to a search application, and then instruct the device to execute a search for a particular piece of information that the user desires reference or use as part of the message.

SUMMARY

In one example, a method includes outputting, by a computing device, for display, a graphical keyboard comprising a plurality of keys, and determining, by the computing device, based on an indication of a selection of one or more keys from the plurality of keys, inputted text. The method may also include determining, by the computing device and based on the inputted text, an information category associated with the inputted text, determining, by the computing device and based on the information category, a graphical symbol associated with the information category, and outputting, by the computing device, for display, the graphical symbol in a suggestion region of the graphical keyboard.

In another example, a computing device comprises a presence-sensitive display component; at least one processor; and a memory storing instructions that when executed cause the at least one processor to: output, for display at the presence-sensitive display component, a graphical keyboard comprising a plurality of keys, and determine, based on an indication of a selection of one or more keys from the plurality of keys detected at the presence-sensitive display component, inputted text. The instructions may further cause the at least one processor to determine, based on the inputted text, an information category associated with the inputted text, determine, based on the information category, a graphical symbol associated with the information category, and output, for display at the presence-sensitive display component, the graphical symbol in a suggestion region of the graphical keyboard.

In another example, A non-transitory computer-readable storage medium comprises instructions that when executed cause at least one processor of a computing device to: output, for display, a graphical keyboard comprising a plurality of keys, and determine, based on an indication of a selection of one or more keys from the plurality of keys, inputted text. The instructions may further cause the at least one processor to determine, based on the inputted text, an information category associated with the inputted text, determine, based on the information category, a graphical symbol associated with the information category, and output, for display, the graphical symbol in a suggestion region of the graphical keyboard.

The details of one or more examples are set forth in the accompanying drawings and the description below. Other features, objects, and advantages of the disclosure will be apparent from the description and drawings, and from the claims.

DETAILED DESCRIPTION

Figure 1:
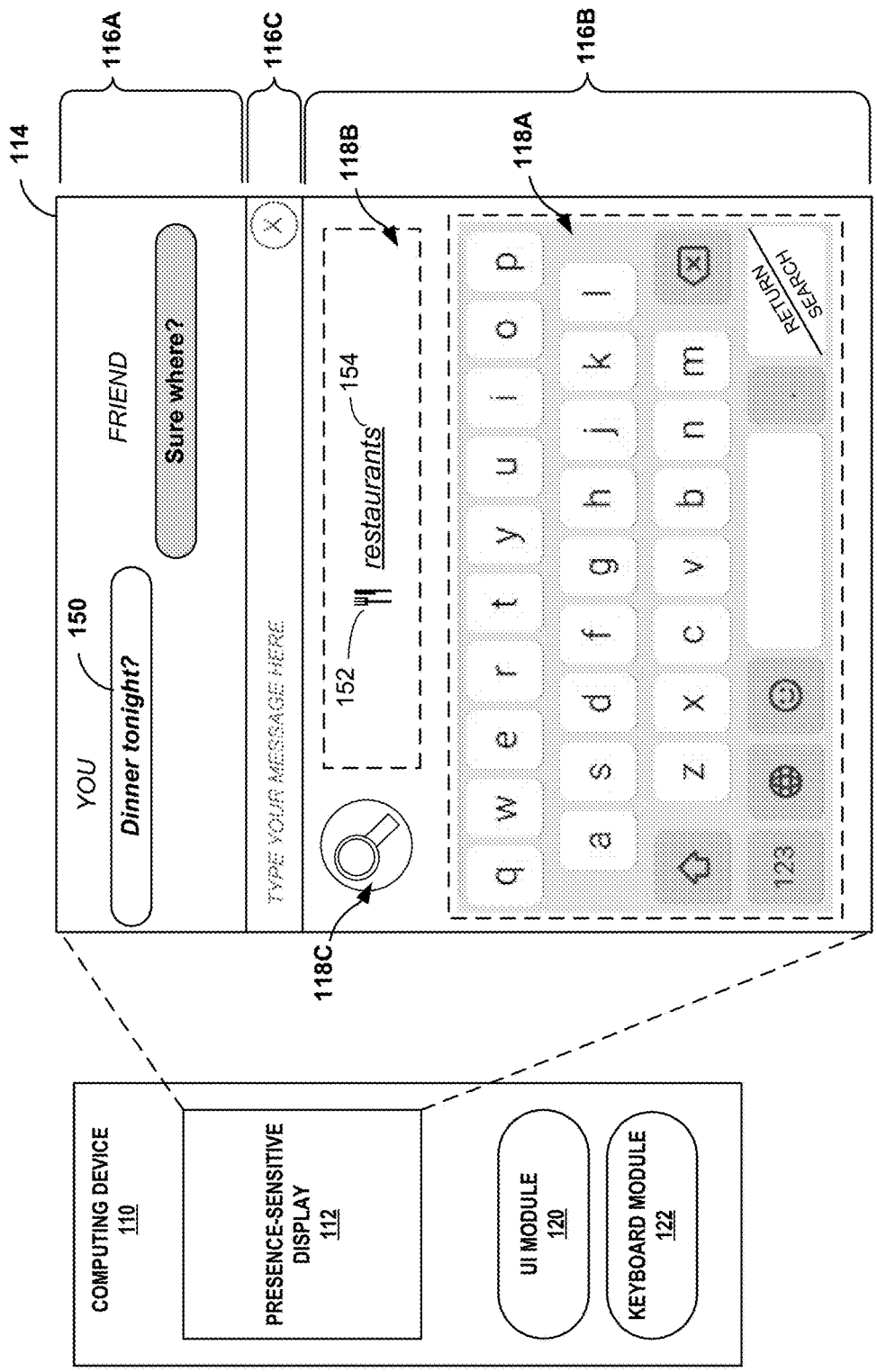
FIG. 1 is a conceptual diagram illustrating an example computing device that is configured to present a graphical keyboard with integrated search features, in accordance with one or more aspects of the present disclosure.

In general, this disclosure is directed to techniques for enabling a computing device to automatically determine graphical elements associated with text being entered with a graphical keyboard and display the suggested content within the graphical keyboard. In various examples, a user may input a text string by selecting characters of a graphical keyboard, with a keyboard module of the computing device analyzing the text string to identify one or more graphical elements associated with the text. The graphical elements may include icons or other graphical elements that may be representative of at least a portion of the text string or of a suggested query determined based on the text string. For example, if a user enters the text string "restaurant," the keyboard module executing at the computing device may map or otherwise determine that the text "restaurant" is associated with a graphical element depicting eating utensils (such as a fork and a knife). As another example, the keyboard module may determine that the text string "when is your flight?" is associated with a graphical element depicting an airplane.

Responsive to identifying the one or more graphical elements, the keyboard module may send a signal configured to cause a display device (such as a display device of the computing device) to output at least one of the identified graphical elements in a suggestion region of the graphical keyboard currently displayed at the display device. In some examples, the keyboard module may also include, within the suggestion region of the graphical keyboard, an indication of the text string entered by the user, a suggested query determined by the keyboard module, or a text input suggestion. For example, the keyboard module may cause the display device to position the graphical element within the suggestion region of the graphical keyboard, such that the graphical element is adjacent to the entered text string, a suggested query, or a text input suggestion.

In this way, techniques of this disclosure may visually indicate a type of information associated with the entered text, which may assist a user in distinguishing the type of content associated with the entered text or in distinguishing the type of search results (such as content responsive to a suggested query) that the user may receive if, for example, the user selects a suggested query. By visually indicating the type of content, the user may more easily determine if the entered text, suggested query, or text input suggestion is properly related to the type of information that the user is attempting to convey, thereby reducing unintentional user inputs, simplifying the user experience, and potentially reducing the rate of power consumption of the computing device.

Throughout the disclosure, examples are described where a computing device and/or a computing system analyzes information (e.g., context, locations, speeds, search queries, etc.) associated with a computing device and a user of a computing device, but only if the computing device has first received permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an example computing device 110 that is configured to present a graphical keyboard with integrated search features, in accordance with one or more aspects of the present disclosure. Computing device 110 may represent a mobile device, such as a smartphone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, or any other types of wearable and non-wearable, mobile or non-mobile computing devices that may output a graphical keyboard for display.

Computing device 110 includes a presence-sensitive display (PSD) 112, user interface (UI) module 120, and keyboard module 122, and keyboard module 122. Modules 120, 122, and 124 may perform operations described using software, hardware, firmware, or a mixture of hardware, software, and firmware residing in and/or executing at computing device 110. One or more processors of computing device 110 may execute instructions that are stored at a memory or other non-transitory storage medium of computing device 110 to perform the operations of modules 120 and 122. Computing device 110 may execute modules 120, 122, and 124 as virtual machines executing on underlying hardware. Modules 120, 122, and 124 may execute as one or more services of an operating system or computing platform. Modules 120, 122, and 124 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interface 114 which, as shown in FIG. 1, is a graphical user interface of a chat application executing at computing device 110 and includes various graphical elements displayed at various locations of PSD 112.

Although shown as a chat user interface, user interface 114 may be any graphical user interface which includes a graphical keyboard with integrated search features. User interface 114 includes output region 116A, graphical keyboard 116B, and edit region 116C. A user of computing device 110 may provide input at graphical keyboard 116B to produce textual characters within edit region 116C that form the content of the electronic messages displayed within output region 116A. The messages displayed within output region 116A from a chat conversation between a user of computing device 110 and a user of a different computing device.

UI module 120 manages user interactions with PSD 112 and other components of computing device 110. In other words, UI module 120 may act as an intermediary between various components of computing device 110 to make determinations based on user input detected by PSD 112 and generate output at PSD 112 in response to the user input. UI module 120 may receive instructions from an application, service, platform, or other module of computing device 110 to cause PSD 112 to output a user interface (e.g., user interface 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard having integrated search features. Keyboard module 122 may switch between operating in text-entry mode in which keyboard module 122 functions similar to a traditional graphical keyboard, or search mode in which keyboard module 122 performs various integrated search functions.

In some examples, keyboard module 122 may be a stand-alone application, service, or module executing at computing device 110 and in other examples, keyboard module 122 may be a sub-component thereof. For example, keyboard module 122 may be integrated into a chat or messaging application executing at computing device 110 whereas in other examples, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be preloaded during production of computing device 110.

The functionality of keyboard module 122 may also be at least partially implemented at a remote computing system (e.g., a remotely located server, cloud-based computing system, etc.) that is communicatively and/or operatively coupled to computing device 110. For example, keyboard module 122 may send a request message to the remote computing system requesting the remote computing system perform certain functionality described as being performed by keyboard module 122 and may receive a response message from the remote computing system that includes the results generated by the remote computing system in performing the requested functionality. As one example, keyboard module 122 may send at least an indication of message 150 to the remote computing system and requested that the remote computing system determine an information category or a graphical element associated with message 150 and receive, in response to the request, an indication of the information category or graphical element associated with message 150.

When operating in text-entry mode, keyboard module 122 of computing device 110 may perform traditional, graphical keyboard operations used for text-entry, such as: generating a graphical keyboard layout for display at PSD 112, mapping detected inputs at PSD 112 to selections of graphical keys, determining characters based on selected keys, and predicting or autocorrecting words and/or phrases based on the characters determined from selected keys.

Graphical keyboard 116B includes graphical elements displayed as graphical keys 118A. Keyboard module 122 may output information to UI module 120 that specifies the layout of graphical keyboard 116B within user interface 114. For example, the information may include instructions that specify locations, sizes, colors, and other characteristics of graphical keys 118A. Based on the information received from keyboard module 122, UI module 120 may cause PSD 112 display graphical keyboard 116B as part of user interface 114.

Each key of graphical keys 118A may be associated with a respective character (e.g., a letter, number, punctuation, or other character) displayed within the key. A user of computing device 110 may provide input at locations of PSD 112 at which one or more of graphical keys 118A is displayed to input content (e.g., characters, search results, etc.) into edit region 116C (e.g., for composing messages that are sent and displayed within output region 116A or for inputting a search query that computing device 110 executes from within graphical keyboard 116B). Keyboard module 122 may receive information from UI module 120 indicating locations associated with input detected by PSD 112 that are relative to the locations of each of the graphical keys. Using a spatial and/or language model, keyboard module 122 may translate the inputs to selections of keys and characters, words, and/or phrases.

For example, PSD 112 may detect an indication of a user input as a user of computing device 110 provides user inputs at or near a location of PSD 112 where PSD 112 presents graphical keys 118A. UI module 120 may receive, from PSD 112, an indication of the user input at PSD 112 and output, to keyboard module 122, information about the user input. Information about the user input may include an indication of one or more touch events (e.g., locations and other information about the input) detected by PSD 112.

Based on the information received form UI module 120, keyboard module 122 may map detected inputs at PSD 112 to selections of graphical keys 118A, determine characters based on selected keys 118A, and predict or autocorrect words and/or phrases determined based on the characters associated with the selected keys 118A. For example, keyboard module 122 may include a spatial model that may determine, based on the locations of keys 118A and the information about the input, the most likely one or more keys 118A being selected. Responsive to determining the most likely one or more keys 118A being selected, keyboard module 122 may determine one or more characters, words, and/or phrases. For example, each of the one or more keys 118A being selected from a user input at PSD 112 may represent an individual character or a keyboard operation. Keyboard module 122 may determine a sequence of characters selected based on the one or more selected keys 118A. In some examples, keyboard module 122 may apply a language model to the sequence of characters to determine one or more the most likely candidate letters, morphemes, words, and/or phrases that a user is trying to input based on the selection of keys 118A.

Keyboard module 122 may send the sequence of characters and/or candidate words and phrases to UI module 120 and UI module 120 may cause PSD 112 to present the characters and/or candidate words determined from a selection of one or more keys 118A as text within edit region 116C. In some examples, when functioning as a traditional keyboard for performing text-entry operations, and in response to receiving a user input at graphical keys 118A (e.g., as a user is typing at graphical keyboard 116B to enter text within edit region 116C), keyboard module 122 may cause UI module 120 to display the candidate words and/or phrases as one or more selectable spelling corrections and/or selectable word or phrase suggestions within suggestion region 118B.

In addition to performing traditional, graphical keyboard operations used for text-entry, keyboard module 122 of computing device 110 also provides integrated search capability. That is, rather than requiring a user of computing device 110 to navigate away from user interface 114 which provides graphical keyboard 116B (e.g., to a different application or service executing at or accessible from computing device 110), keyboard module 122 may operate in search mode in which keyboard module 122 may execute search operations and present search results within the same region of PSD 112 at which graphical keyboard 116B is displayed.

As indicated above, keyboard module 122 may execute as a stand-alone application, service, or module executing at computing device 110 or as a single, integrated sub-component thereof. Therefore, if keyboard module 122 forms part of a chat or messaging application executing at computing device 110, keyboard module 122 may provide the chat or messaging application with text-entry capability as well as search capability. Similarly, if keyboard module 122 is a stand-alone application or subroutine that is invoked by an application or operating platform of computing device 110 any time an application or operating platform requires graphical keyboard input functionality, keyboard module 122 may provide the invoking application or operating platform with text-entry capability as well as search capability.

Keyboard module 122 may further operate in search mode. In some examples, keyboard module 122 may cause graphical keyboard 116B to include search element 118C. Search element 118C represents a selectable element of graphical keyboard 116B for invoking one or more of the various search features of graphical keyboard 116B. By selecting search element 118C (e.g., by tapping or gesturing at a location or within a region of PSD 112 at which search element 118C is displayed), a user can cause computing device 110 to invoke the various integrated search features without having to navigate to a separate application, service, or other feature executing at or accessible from computing device 110.

For example, UI module 120 may output information to keyboard module 122 indicating that a user of computing device 110 may have selected selectable element 118C. Responsive to determining that element 118C was selected, keyboard module 122 may transition to operating in search mode. While operating in search mode, keyboard module 122 may reconfigure graphical keyboard 116B to execute search features as opposed to operations that are primarily attributed to text entry.

For example, keyboard module 122 may configure suggestion region 118B to present suggested content (e.g., predicted search queries, predicted emoticons or so called "emojis", or other suggested content) as selectable elements within search element 118C instead of predicted characters, words or phrases or other primarily linguistic information that keyboard module 122 derives from a language model, lexicon, or dictionary. In other words, rather than providing spelling or word suggestions from a dictionary within suggestion region 118B, computing device 110 may include, within suggestion region 118B, suggested search related content that computing device 110 determines may assist a user in providing input related to electronic communications.

In various examples, a user inputs text using computing device 110 (e.g., as part of a messaging environment, into a search field displayed by the computing device 100 in order to initiate a search for information, etc.) and keyboard module 122 of computing device 110 may map an information category associated with the inputted text to one or more graphical elements. For example, keyboard module 122 may dynamically analyze the inputted text to identify predetermined words, phrases, etc. Based on the identified words and/or phrases, keyboard module 122 may determine one or more information categories associated with the identified words and/or phrases and map the determined information categories to one or more graphical elements. These graphical elements, when displayed in association with suggested content on computing device 110, may assist the user to distinguish the type of content the user may receive if, for example, the user selects the suggested content.

Keyboard module 122 may analyze message 150 and determine that is includes the word "dinner." In various instances, the word "dinner" may be associated with a "restaurants" information category. That is, as a user of computing device 110 is typing in a text message, such as "Dinner tonight?", keyboard module 122 may automatically identify the word "dinner" and map "dinner" to the category "restaurants." In turn, the "restaurants" information category may be mapped to graphical element depicting a knife and fork. The knife-and-fork graphical element is one example of an iconographical symbol that may be associated with various information categories. Other example iconographical symbols are described below with respect to FIG. 5. In general, any iconographical symbol or other graphical element may be associated with each information category.

In some examples, keyboard module 122 may also dynamically generate a suggested query based on the entered text. As shown in FIG. 1, keyboard module 122 analyzed the text "dinner tonight?" and generated the suggested query "restaurants." Rather than or in addition to determining the information category of the entered text and using the information category of the entered text to determine the graphical element associated with the entered text, keyboard module 122 may determine an information category of the suggested query and determine the graphical element associated with the information category of the suggested query. In the example of FIG. 1, the suggested query is the term "restaurants," which happens to correspond to the same information category (restaurants) as the entered text. However, in other examples, the suggested query may be associated with a different information category than the entered text. In any case, keyboard module 122 causes the suggested query 154 and the associated graphical element 152 to be included within suggestion region 118B of graphical keyboard 116B.

Without the graphical element, the text include within suggestion region 118B may not provide an immediate indication of the type of information associated with the text or electronic link. For example, a word such as "mustangs" could be associated with a type of horse, or for example with a mascot or nickname for a sports team, etc. If suggestion region 118B just included the word "mustangs," it might not be apparent to the user what information is associated with that link or text. However, if, in addition to the text itself, a graphical symbol representative of "sports" is included within suggestion region 118B in addition to the text "mustang," the user may quickly determine if the link has an association with the type of information the user is interested in without having to necessary open the link to further determine the nature of the information. This added feature may save time and frustration when a user is trying to quickly review information provide in the suggested content portion of the computing device 110 to see if the suggest content corresponds to the type of information the user is looking for.

By including the graphical element associated with the entered text and/or a suggested query, techniques of this disclosure may provide a mechanism by which a user of computing device 110 may quickly ascertain the type of information associated with the entered text or suggested query. In this way, the user may quickly discern the type of information with which the text provided in the suggestion region 118B is associated without having to necessarily read and comprehend the text itself or select the text displayed within suggestion region 118B. In this way, the techniques of the disclosure may enable a computing device 110 to provide a graphical keyboard with integrated search features that include graphical symbols mapped to other content, such as text and electronic links to other content, that indicate to a user the general nature or category associated with the text or electronic link provided as suggested content by the computing device 110.

Figure 2:
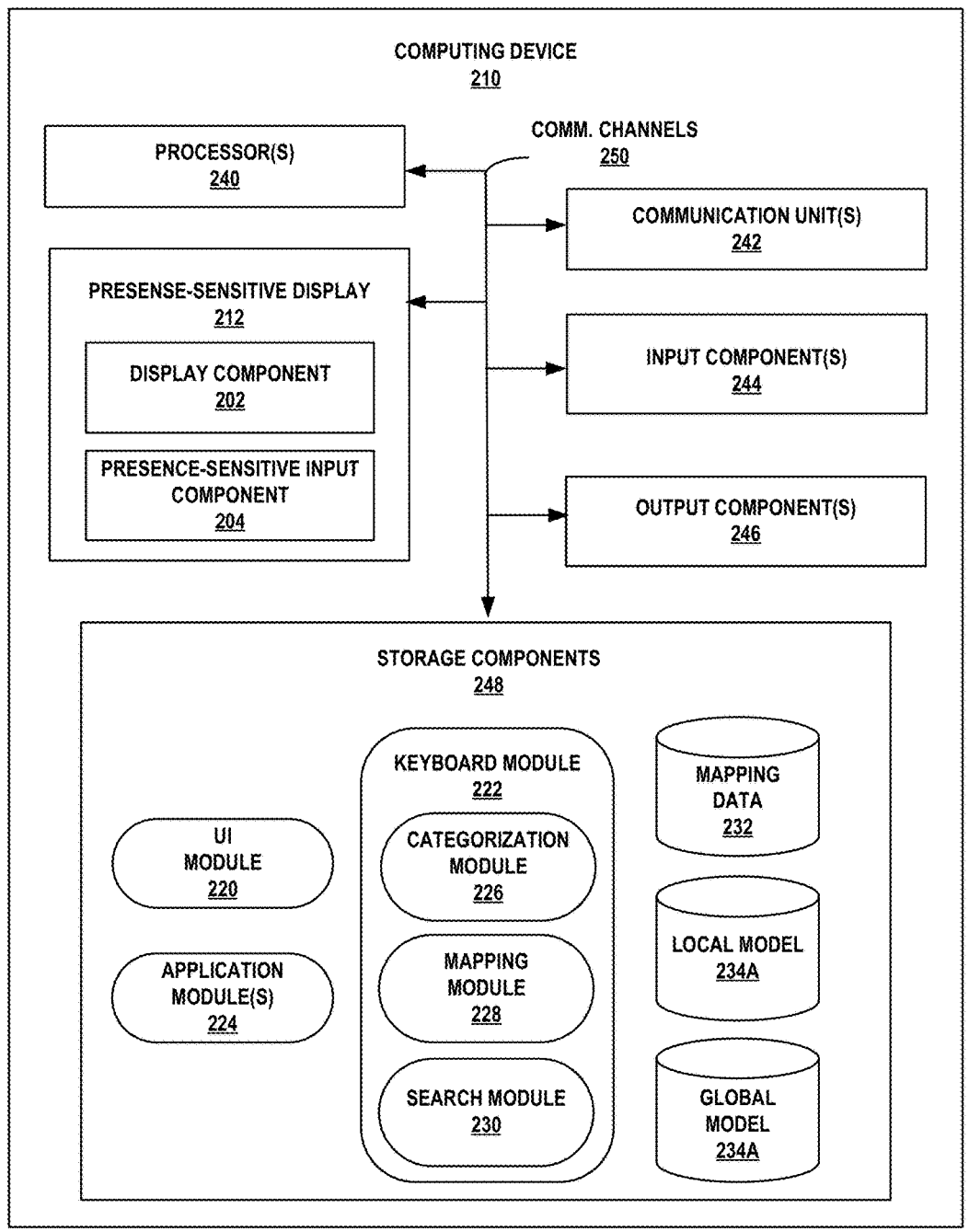
FIG. 2 is a block diagram illustrating an example computing device that is configured to present a graphical keyboard with integrated search features, in accordance with one or more aspects of the present disclosure.

FIG. 2 is a block diagram illustrating computing device 210 as an example computing device that is configured to present a graphical keyboard with integrated search features, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 is similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

While illustrated as an internal component of computing device 210, PSD 212 may also represent and an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 and models 232 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with models 232 and modules 220, 222, 224, 226, 228, and 230. Storage components 248 may include a memory configured to store data or other information associated with modules 220, 222, 224, 226, 228, and 230, mapping data 232, and local models 234A and global models 234B (collectively, "models 234").

Storage components 248 of computing device 210 include UI module 220, keyboard module 222, one or more application modules 224, mapping data 232 and models 234. UI module 220 may include all functionality of UI module 120 of computing device 110 of FIG. 1 and may perform similar operations as UI module 120 for managing a user interface (e.g., user interface 114) that computing device 210 provides at presence-sensitive display 212 for handling input from a user. For example, UI module 220 of computing device 210 may query keyboard module 222 for a keyboard layout (e.g., an English language QWERTY keyboard, etc.). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 22 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIG. 1 and may perform similar operations as keyboard module 122 for providing a graphical keyboard having integrated search features. Keyboard module 222 may include various sub-modules, such as categorization module 226, mapping module 228, and search module 230, which may perform the functionality of keyboard module 222.

In some examples, keyboard module 222 may include a spatial module and/or a language module for determining words from the touch events generated by presence-sensitive display 212 in response to detecting user input at various locations of presence-sensitive display 212. For example, the spatial module may receive one or more touch events as input, and output a character or sequence of characters that likely represents the one or more touch events, along with a degree of certainty or spatial model score indicative of how likely or with what accuracy the one or more characters define the touch events. In other words, the spatial model may infer touch events as a selection of one or more keys of a keyboard and may output, based on the selection of the one or more keys, a character or sequence of characters.

When keyboard module 222 operates in text-entry mode, the language model may receive a character or sequence of characters as input, and output one or more candidate characters, words, or phrases that the language model identifies from a lexicon as being potential replacements for a sequence of characters that language model receives as input for a given language context (e.g., a sentence in a written language). Keyboard module 222 may cause UI module 220 to present one or more of the candidate words at suggestion region 118B of user interface 114.

The lexicon of computing device 210 may include a list of words within a written language vocabulary (e.g., a dictionary). For instance, the lexicon may include a database of words (e.g., words in a standard dictionary and/or words added to a dictionary by a user or computing device 210. Keyboard module 222 may use the language model to perform a lookup in the lexicon, of a character string, to identify one or more letters, words, and/or phrases that include parts or all of the characters of the character string. For example, the language model may assign a language model probability or a similarity coefficient (e.g., a Jaccard similarity coefficient, or other similarity coefficient) to one or more candidate words located at a lexicon of computing device 210 that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by keyboard module 222 using the language model. In response to determining the one or more candidate words, keyboard module 222 may output the one or more candidate words from lexicon data stores 260A that have the highest similarity coefficients.

In various instances, a user may select one of the candidate words, may begin typing another word, or may select a punctuation mark or enter/send key. Responsive to selection of a punctuation mark or the enter or send key, categorization module 226 may analyze the entered text and determine an information category associated with the entered text. For example, categorization module 226 may utilize models 234 to determine the information category for the entered text.

Models 234 represent multiple "on-device" (e.g., locally stored and executed) models for use by annotators or text analysis engines of categorization module 226 to parse and analyze text being input at graphical keyboard 116B to detect if a user has typed something at graphical keyboard 116B that is associated with an information category. Models 234 may receive as input, text inferred from user input at graphical keyboard 116B, and output in response, one or more entities or trigger phrases that may be related to portions of the text input. In some examples, models 234 may output a score associated with an entity or trigger phrase as an indication of a probability that the entity or trigger phrase is related to the text input.

By storing and executing models 234 locally, "on-device" (as opposed to "off-device" like other traditional systems that may rely on remote annotators executing at a remote computing systems), computing device 210 may perform determine information categories for the inputted text in seemingly near real-time so as to avoid interrupting or falling behind in a text conversation that a user may be having when typing at graphical keyboard 116B.

Categorization module 226 may automatically download new local models 234A in response to the location of computing device 210 changing. For example, categorization module 226 may receive information from one or more of communication units 242 and/or input components 244 (e.g., a GPS receiver) about the current location of computing device 210. Responsive to determining that the current location does not correspond to the location associated with local model 234A, categorization module 226 may query a remote computing system for an updated local model of the current location. Upon receiving the updated local model 234A from the remote computing system, categorization module 226 replace the previous local model 242A with a copy of the updated local model 234A. In other words, in some examples, categorization module 226, responsive to determining a change in the current location of computing device 210 from a first location to a second location, may obtain, from a remote computing system, an updated model 234A of entities, the updated model 234A being associated with the second location, and may replace the original local model 234A with the updated model 234A.

Categorization module 226 may parse text being entered at graphical keyboard 116B so as to detect entities and trigger phrases, using both global model 234B and local model 234A. For example, categorization module 226 may determine, based on at least a portion of the text inferred from a selection of graphical keys 118, one or more words from a lexicon of the language model. Categorization module 226 may input the one or more words into local model 234A to determine the one or more local entities that local model 234A determines to be relevant to the one or more words. Categorization module 226 may also obtain, from local model 234A, a respective score assigned to each of the one or more local entities indicating a probability that the entity is relevant to the one or more words. In identifying an entity to use in determining the information category. Categorization module 226 may compare the respective scores associated with the local entities to a threshold. Responsive to determining the score assigned to a local entity satisfies the threshold, categorization module 226 may identify the local entity as being suitable for determining the information category for the inputted text.

Categorization module 226 may input the one or more words into global model 234B to determine one or more global entities that global model 234B determines to be relevant to the one or more words. Categorization module 226 may also obtain, from global model 234B, a respective score assigned to each of the one or more global entities indicating a probability that the entity is relevant to the one or more words. In identifying an entity to use in generating a query. Categorization module 226 may compare the respective scores associated with the global entities to a threshold. Responsive to determining the score assigned to a global entity satisfies the threshold, categorization module 226 may identify the global entity as being suitable for determining the information category for the inputted text.

Categorization module 226 may select, from amongst the identified global and local entities, the highest scoring one or more entities from the local and global models 234. From the highest scoring entities, categorization module 226 may select an information category for the inputted text.

In addition to identifying entities, local and/or global models 232 that are used by categorization module 226 may also suggest curated phrases to use in selecting the information category for the inputted text. Categorization module 226 may determine, based at least in part on the entity or a trigger phrase included in the entity, a curated phrase associated with the entity, and determine, from the curated phrase, the information category for the inputted text. For example, keyboard module 222 may provide text (e.g., the phrase "what time is kickoff") inferred from user input at graphical keyboard 116B into the local and/or global models 234 and in response to local model 234A recognizing the text as including text of a predetermined trigger receive as output from model 234, one or more curated phrases, such as "local sports team schedule". Based on this curated phrase, categorization module 226 may determine that the inputted text is associated with a sports information category.

In some examples, the annotators of categorization module 226 may further rely a current context of computing device 210 to determine an entity and/or curated phrase for use in determining the information category for the inputted text. As used herein, a current context specifies the characteristics of the physical and/or virtual environment of a computing device, such as computing device 210, and a user of the computing device, at a particular time. In addition, the term "contextual information" is used to describe any information that can be used by a computing device to define the virtual and/or physical environmental characteristics that the computing device, and the user of the computing device, may experience at a particular time.

Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210.

Categorization module 226 may rely on artificial intelligence and machine learning techniques to determine with a degree of confidence, whether a user is typing about a particular curated phrase for a particular context. For example, using one or more rules about what other people type in chat conversations for various context, the annotators may generate rules for inferring curated phrases based on text input and a particular context. Using the rules, the annotators may predict with a degree of certainty whether a user is chatting about "restaurants near me", "food nearby", "movies playing at a nearby theater", "directions to a place" or some other curated phrase that may be related the text input. If the degree of certainty (e.g., a probability) satisfies a threshold, keyboard module 122 may use the curated phrase in producing a query.

Categorization module 226 may rely on the current context of computing device 210 to settle ambiguity in determining entities. For example, if the text of a chat conversation includes the phrase "what time is kickoff" categorization module 226 may obtain from global model 232B the names of several professional football teams that are scheduled to play that day. Categorization module 226 may infer, based on the current location of computing device 210, which the user is likely referring to the professional team that is associated with a location nearest the current location of computing device 210 as being the professional team which the user is referring. In such an example, categorization module 226 may determine that the information category for the inputted text is the name of the local professional sports team.

In addition to relying on the text of a current message being input at computing device 210, categorization module 226 may rely previous words, sentences, etc. associated with previous messages sent and/or received by computing device 210 to determine an information category for the inputted text. In other words, categorization module 226 may rely on the text of an entire conversation including multiple messages that computing device 210 has sent and received to determine the information category for the inputted text that is likely to be relevant to a current conversation.

Mapping module 228 may use the information category determined by categorization module 226 to query mapping data 232 and determine the graphical element associated with the information category. For example, if categorization module 226 determined that "sports" is the information category for the inputted text, mapping module 228 may query mapping data 232 using the term "sports". In this example, mapping data 232 includes a mapping of the term "sports" to a graphical element including a bat and ball. As another example, if categorization module 226 determined that "flights" is the information category for the inputted text, mapping module 228 may query mapping data 232 using the term "flights". Mapping data 232 may include a mapping of the term "flights" to a graphical element including an airplane. Mapping module 228 may provide an indication of the mapped graphical element to keyboard module 222 which, in turn, may cause the graphical element to be included within suggestion region 118B of graphical keyboard 116B of FIG. 1.

While described as including the graphical element within suggestion region 118B, in some examples, keyboard module 222 may output a search region of graphical keyboard 116B. The search region may be in addition to or in place of suggestion region 118B. In general, search region of graphical keyboard 116B is a portion of graphical keyboard 116B in which suggested search queries are output. For example, the search region may be positioned above suggestion region 118B and below edit region 116C and may include one or more suggested queries as well as the associated graphical elements.

Search module 230 of keyboard module 222 may perform integrated search functions on behalf of keyboard module 222. That is, when invoked (e.g., manually in response to a user of computing device 210 selecting selectable element 118C of user interface 114 or automatically in response to identifying a searchable entity or trigger phrase from text input), keyboard module 222 may operate in search mode where keyboard module 222 enables computing device 210 to perform search functions from within graphical keyboard 116B, such as predicting and displaying search queries that a user of computing device 210 may find relevant to a chat conversation.

Search module 230 may determine a suggested query similarly to how categorization module 226 determines the information category for the inputted text, as described above. For example, search module 230 may parse text being entered at graphical keyboard 116B so as to detect searchable entities and trigger phrases, using both global model 234B and local model 234A. For example, search module 230 may determine, based on at least a portion of the text inferred from a selection of graphical keys 118, one or more words from a lexicon of the language model. Search module 230 may input the one or more words into local model 234A to determine one or more local search entities that local model 234A determines to be relevant to the one or more words. Search module 230 may also obtain, from local model 234A, a respective score assigned to each of the one or more local search entities indicating a probability that the search entity is relevant to the one or more words. In identifying a search entity to use in generating a query, search module 230 may compare the respective scores associated with the local search entities to a threshold. Responsive to determining the score assigned to a local searchable entity satisfies the threshold, search module 230 may identify the local searchable entity as being suitable for generating a predicted query.

In some examples, categorization module 226 may determine an information category for the predicted query. For example, if search module 230 generates the predicted query, "restaurants near me", categorization module 226 may analyze the phrase "restaurants near me" and determine the information category for that phrase. In this example, categorization module 226 may determine that the information category associated with the predicted query is "restaurants" and provide the information category to mapping module 228. Mapping module 228 may query mapping data 232 using the term "restaurants" and may receive an indication of a knife-and-fork graphical element. Keyboard module 222 may include the knife-and-fork graphical element within suggestion region 118B and located adjacent to the suggested query. That is, as a further indication that keyboard module 222 determined the search query, keyboard module 222 may cause UI module 220 to present an icon associated with a category of the search query next to the textual language of the query. For example, as shown in FIG. 1, PSD 112 displays a fork and knife icon next to the underlined word restaurants within suggestion region 118B.

Figure 3:
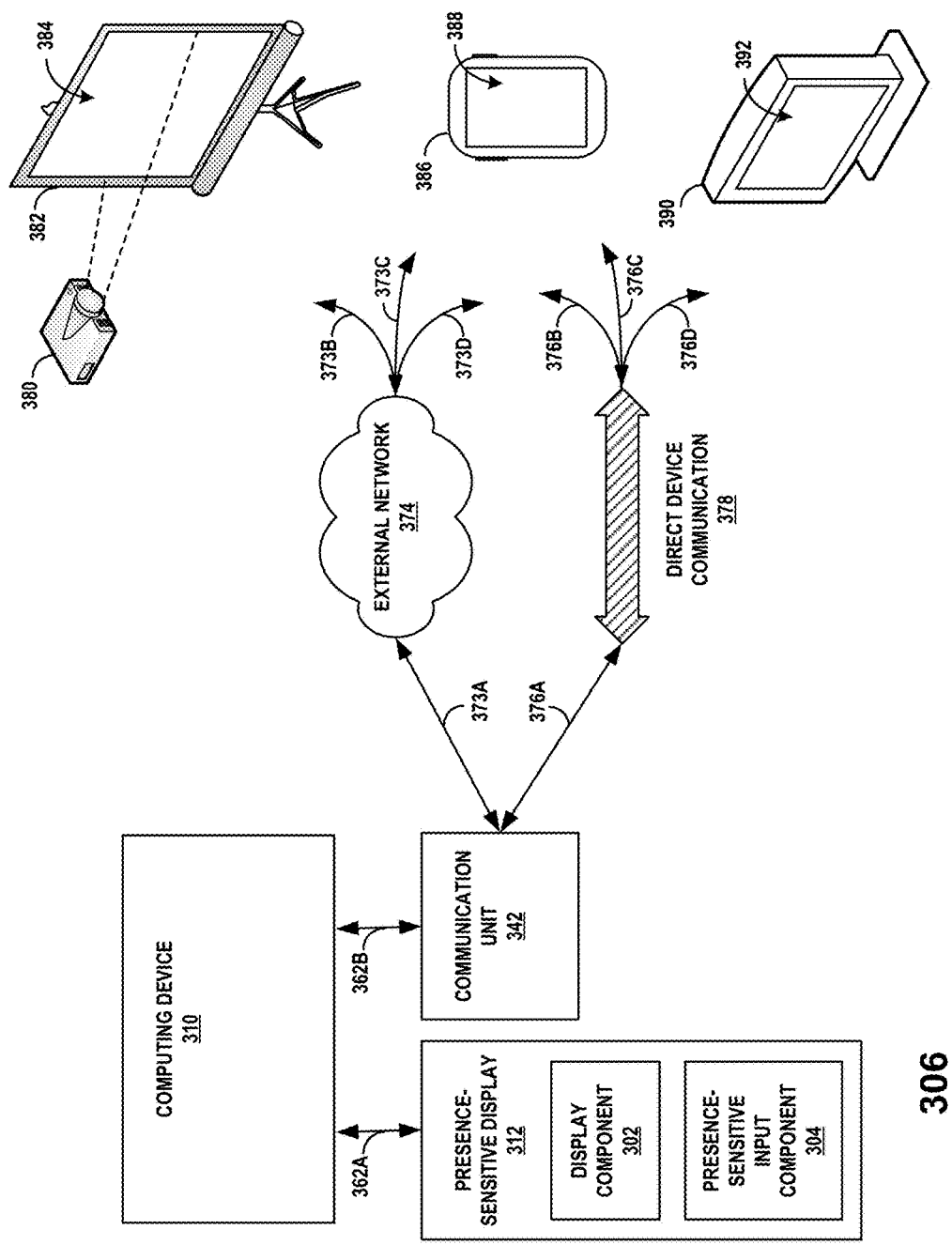
FIG. 3 is a block diagram illustrating an example computing device that outputs graphical content for display at a remote device, in accordance with one or more aspect of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, and a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 392. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 392 to output the graphical keyboard. In response to receiving a user input at PSD 392 to select one or more keys of the keyboard, visual display device 130 may send an indication of the user input to computing device 310 using external network 374. Communication unit 342 of may receive the indication of the user input, and send the indication to computing device 310.

Computing device 310 may determine, based on the user input, a selection of one or more keys. Computing device 310 may determine, based on the selection of one or more keys, one or more words. Computing device 310 may identify, based at least in part on the one or more words, am entity and may determine, based on the entity, an information category for the inputted text. Computing device 310 may determine, based on the information category, a graphical element associated with the inputted text and may output, for display within the graphical keyboard, the graphical element for the information category associated with the inputted text. Communication unit 342 may receive the representation of the updated graphical user interface and may send the send the representation to visual display component 390, such that visual display component 390 may cause PSD 392 to output the updated graphical keyboard, including the graphical element indicative of the information category associated with the inputted text.

Figure 4:
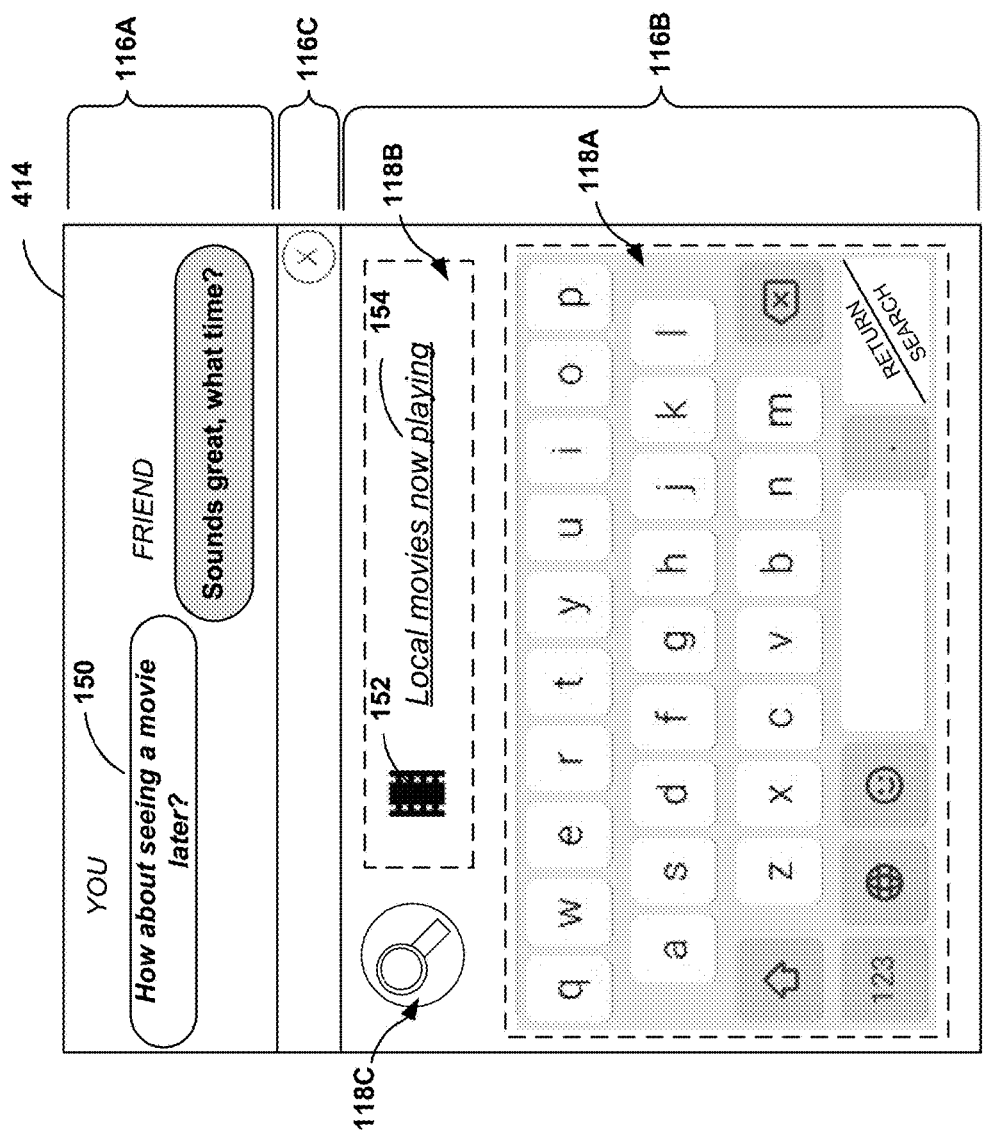
FIGS. 4 and 5 are conceptual diagrams illustrating example graphical user interfaces of an example computing device that is configured to present a graphical keyboard with integrated search features, in accordance with one or more aspects of the present disclosure.
Figure 5:
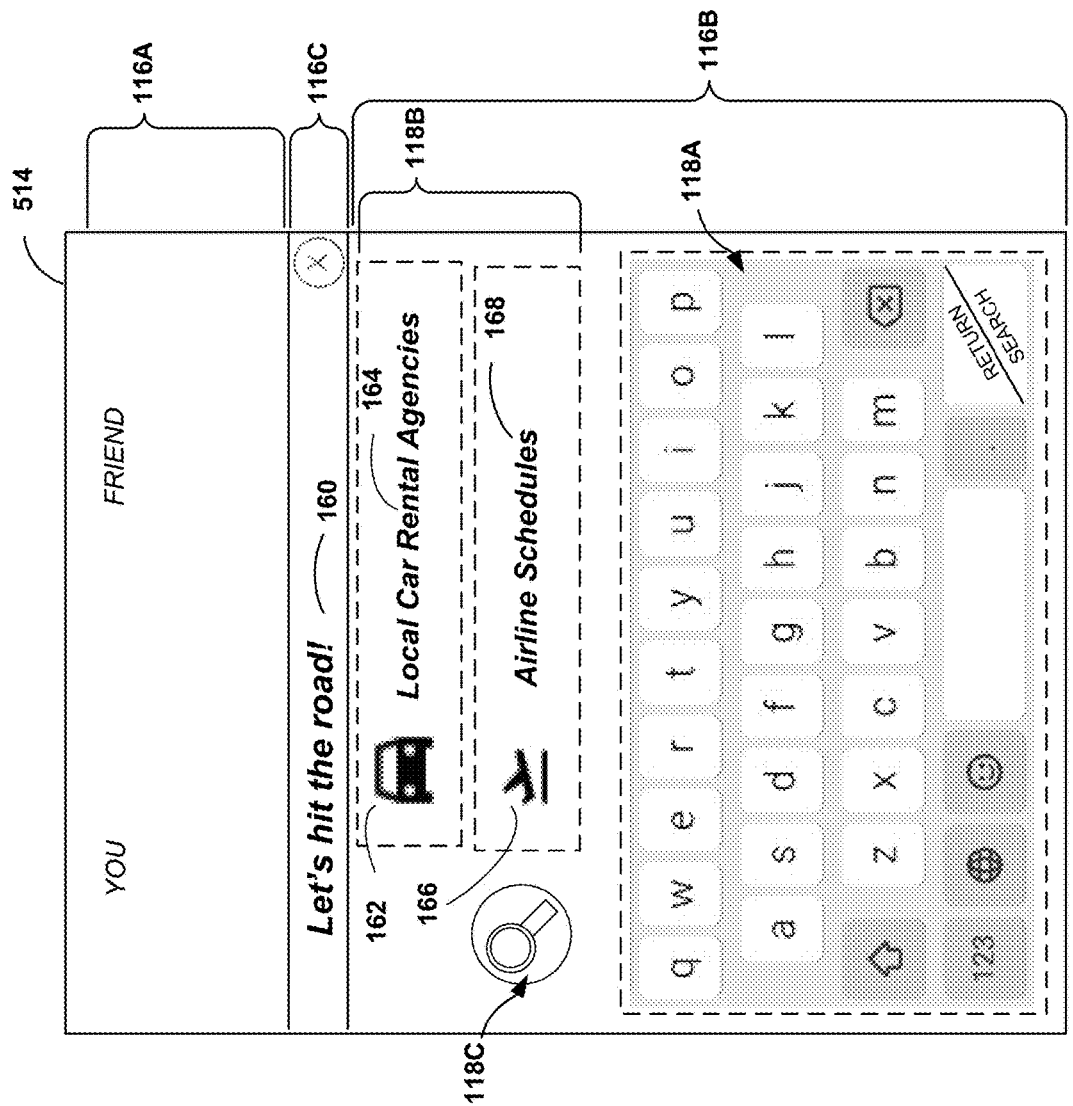

FIGS. 4 and 5 are conceptual diagrams illustrating example graphical user interfaces of an example computing device that is configured to present a graphical keyboard with integrated search features, in accordance with one or more aspects of the present disclosure. FIGS. 4A-4C illustrate, respectively, example graphical user interfaces 414A-414C (collectively, user interfaces 414). However, many other examples of graphical user interfaces may be used in other instances. Each of graphical user interfaces 414 may correspond to a graphical user interface displayed by computing devices 110 or 210 of FIGS. 1 and 2 respectively. Various examples are described below with respect to FIGS. 4A-4C in the context of computing device 110.

As shown in FIG. 4, graphical user interface 414 includes output region 116A, graphical keyboard 116B, and edit region 116C. Graphical keyboard 116B includes graphical elements displayed as graphical keys 118A, suggestion region 118B, and search element 118C. In the example of FIG. 4, a user (identified as "YOU" in output region 116A) enters text 150 "How about seeing a movie later?". In various examples, the user enters the message 150 by selecting graphical keys of keyboard 116B according to any of the techniques described herein. In various examples, text 150 is received by computing device 110 as an audio (e.g., voice) input, and computing device 110 uses voice recognition, or other techniques described herein, to convert the audio input into text 150.

Keyboard module 122 analyzes text 150 to determine if text 150 includes any keywords, phrases, or words or phrases that can be mapped to one or more information categories. Keyboard module 122 may initiate the analysis of text 150 in response to computing device 110 receiving an input indicating that the entry of the text 150 is complete. In various examples, keyboard module 122 may analyzes text 150 as text 150 is being received by computing device 110. For example, if user "YOU" is using keyboard 116B to type inputs for text 150, keyboard module 122 may analyze the inputs as the keyboard inputs are being received rather than waiting for some type of indication that text 150 is complete, such as the user pressing the "enter" key on keyboard 116B.

As noted above, keyboard module 122 may analyze text 150 by at least detecting whether text 150 includes any keywords that are associated with one or more information categories. In various examples, the word "movie" is a keyword that is associated with one or more of information categories. Keyboard module 122 identifies the keyword "movie" within text 150 and maps the keyword "movie" to the "movies" information category. Further, search module 230, based on text 150, may generate the predicted query "Local movies now playing". Based on the mapping of text 150 to the information category "movies" and the suggested query "Local movies now playing", keyboard module 122 includes graphical element 152 and suggested query 154 within suggestion region 118B.

By including graphical element 152 within suggestion region 118B, the user "YOU" may be able to more quickly determine that the information associated with suggested query 154 is related to movies, and therefore can determine whether to further pursue that search by selecting suggested query 154. In this way, by looking at a visually recognizable graphical symbol, user "YOU" may be able to quickly determine if the suggested query 154 is associated with a link or a category of information the user might be interested in.

FIG. 5 is an example conceptual diagram illustrating an example graphical user interface of an example computing device that is configured to present a graphical keyboard with integrated search features, in accordance with one or more aspects of the present disclosure. As shown in FIG. 5, graphical user interface 514 in which a user has inputted text 160, "Let's hit the road!", which is displayed within text edit region 116C, but has not yet selected the return/send button to cause text 160 to be sent to the friend and displayed within output region 116A. In this example, keyboard module 122 is configured to analyze text 160 either as the user provides input for message 160 and/or in response to determining that the user has inputted a punctuation mark. In either instance, keyboard module 122 analyzes text 160 and determines that at least two different information categories may be associate with text 160. For example, keyboard module 122 may determine that the phrase "Let's hit the road" may be associate with travel in general, and, more specifically, various different types of travel, including cars, trains, and airplanes. Based on prior travel arrangements of the user of computing device 110, keyboard module 122 may determine that the user typically travels using cars or planes and ranks the information categories for air travel and auto travel higher than for rail travel. Responsive to determining these information categories, keyboard module 122 may map the "car" and "airplane" information categories to car and airplane graphical elements, respectively. Keyboard module 122 may include the car and airplane graphical elements as elements 162 and 166 within suggestion region 118B

In some examples, keyboard module 122 may also generate a suggested query based on text 160. For example, keyboard module 122 may determine a current location of computing device 110 and determine that computing device 110 is located within a threshold distance of an airport. Keyboard module 122 may also determine that the user of computing device 110 frequently rents cars when traveling. Based at least in part on the prior user behavior and the current location of computing device 110, keyboard module 122 may generate suggestion queries 164 and 168.

Instead of or in addition to determining information categories associated with text 160, keyboard module 122 may determine respective information categories associated with each of suggested queries 164 and 168. For example, keyboard module 122 may determine that suggested query 164 is associated with a car travel information category and suggested query 168 is associated with an airplane travel information category. Keyboard module 122 may map the car travel and airplane travel information categories to graphical elements 162 and 166, respectively, and may include graphical elements 162 and 166 as well as suggested queries 164 and 168 within suggestion region 188B.

Figure 6:
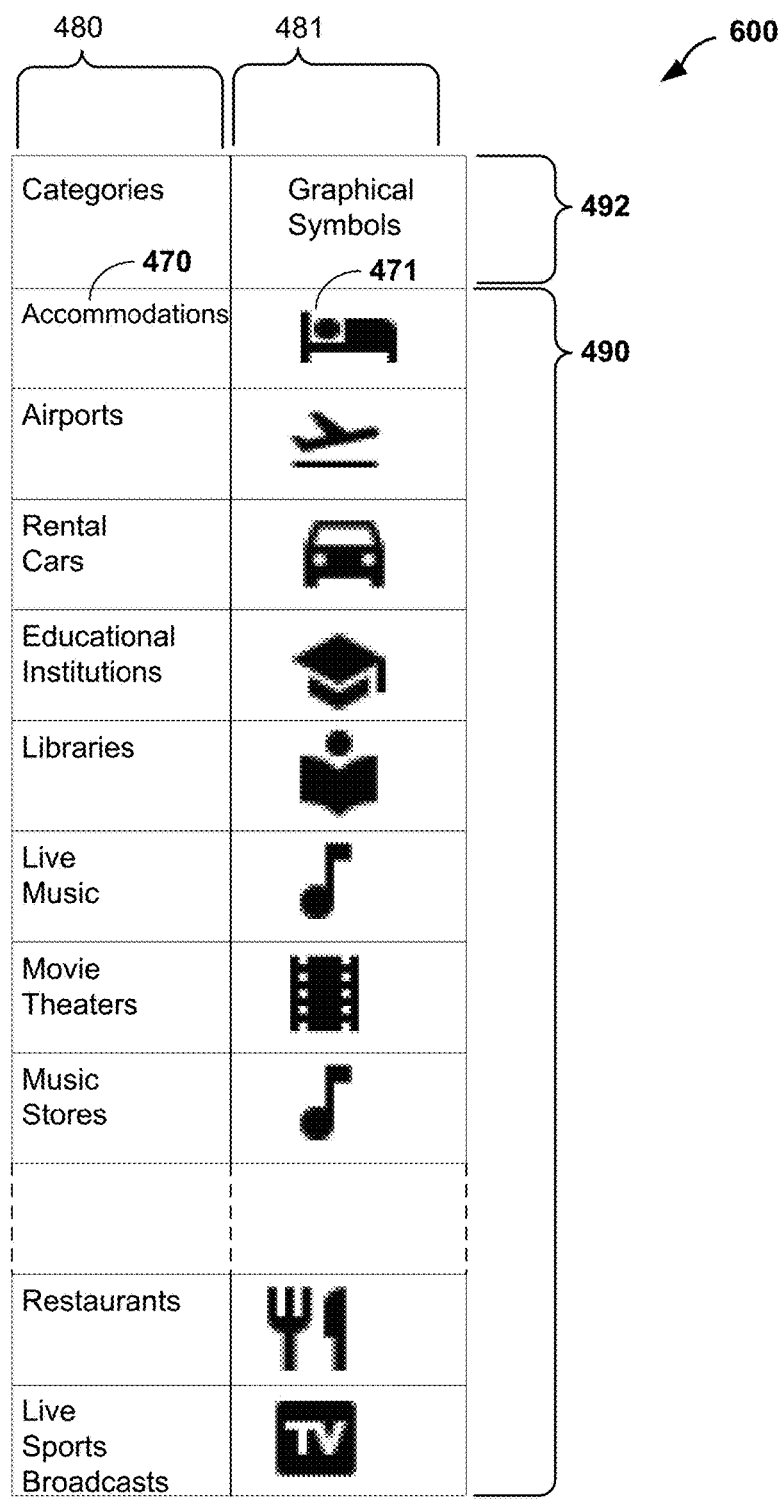
FIG. 6 is a conceptual diagram illustrating an example mapping table, in accordance with one or more aspects of the present disclosure.

FIG. 6 is a conceptual diagram illustrating an example mapping table 600, in accordance with one or more aspects of the present disclosure. In various examples, mapping table 600 is one example of mapping data 232 shown in FIG. 2. However, mapping table 600 is not limited to any particular data structure or to being stored within a computing device such as computing devices 110, 210 and 310. In various examples, mapping table 600 may be stored externally to computing device 110, where computing device 110 is operable to mapping table 600 in order to provide any of the functions and features descried herein, or the equivalents thereof.

The term "category" as used herein in not limited to any particular type of category or to a grouping of any particular type of items, symbols, ideas, features, or functions, and can include a grouping of any items, living things, inanimate objects, services, places, ideas, concepts, events, terms, and any combinations thereof deemed appropriate to be designated as a "category." Non-limiting illustrative examples of a "category" can include object such as cars, planes, highways, and books; places such as cities, airports, libraries, shopping malls; services such as car repair, hair style salons, pizza delivery; organizations including governmental agencies and private companies; and events such as sporting events, political debates, etc. These examples are not intended to be limiting, and "category" or "categories" as used herein can include any classification of one or more items into a grouping. In various examples, new categories can be created, and existing categories can be removed, combined, and redefined based on new objects, new ideas, or as different rules and criteria are discovered and defined for use in the classification of what is to be included in a "category" and how such categories are defined.

As shown in FIG. 6, mapping table 600 is implemented as an array comprising a series of columns 480, 481, 482, and 483, each column traversing a series of rows 490. The number of rows included in mapping table 600 is not limited to any particular number of rows, and in various examples can include additional rows. As illustrated, each of columns 480, 481, 482, and 483 include a header row 492 with a header title that is descriptive of the information included within rows 490 and under the particular column. For example, column 480 includes header title "Categories" in row 492, and each of rows 490 under column 480 includes a name of a particular category associated with the category assigned to that particular row. By way of example, illustrative row 493 of rows 490 includes the word "Accommodations" as a name 470 in the category column 480 associated with the category "Accommodations" and row 493. Column 481 includes the header "Graphical Symbols" in row 492, and each of rows 490 under column 481 includes a graphical symbol mapped to the category assigned to the particular row. By way of example, row 493 includes graphical symbol 471 as the graphical symbol mapped to the "Accommodations" category of row 493. In various examples, not every row of rows 490 includes a graphical symbol mapped to the category associated with that row. In addition, in various examples the graphical symbol mapped to a particular row of rows 490 can be modified, removed, or replaced with a new or different graphical symbol.

Graphical symbols as used herein are not limited to any particular type or types of graphical symbols, and can be any graphical symbol that is operable to be displayed as on output by computing device 110. Examples of graphical symbols include, but a not limited to ICONs (e.g. graphical symbols often used in computer applications and windows to represent computer functions), standardized symbols used by governmental agencies, such standardized symbols used for highway signs and at airports to represent various features and types of information, symbols used by private companies or institutions, such as various symbols used in the automotive industry for automobile dashboards and radio/navigation/HVAC control devices in an automobile, emoticon (symbols expressing emotions), ideogram (e.g. picture of finger pointing representative of an thing or idea), a logo of any kind, or for example a trademark symbol representing a company or a service. Graphical symbols can also be created by popular culture, such as social media, where a graphical symbol becomes recognized based on popular use of the graphical symbol in social media. These examples are provided as illustrative of graphical symbols, and are not intended to be an exhaustive list of the possible types of graphical symbols that are contemplated as being included within the definition of a graphical symbol as used herein.

Figure 7:
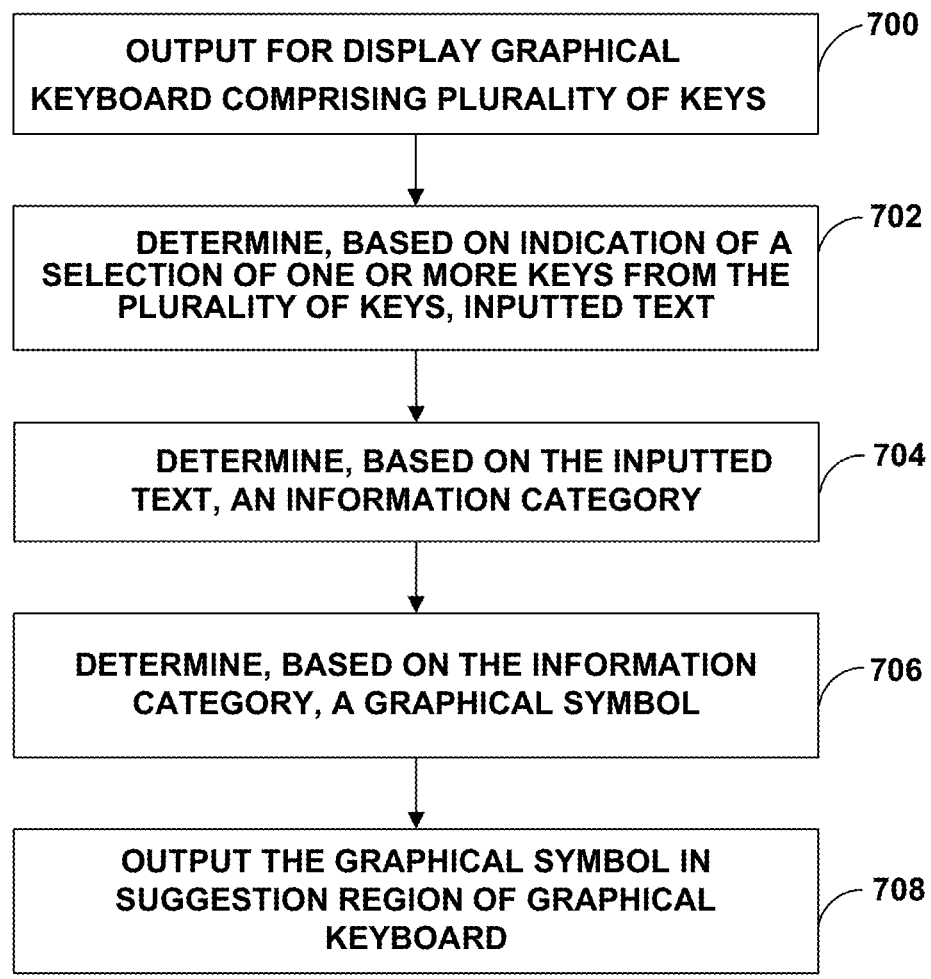
FIG. 7 is a flowchart illustrating example operations of a computing device that is configured to present a graphical keyboard with integrated search features, in accordance with one or more aspects of the present disclosure.

FIG. 7 is a flowchart illustrating example operations of a computing device that is configured to present a graphical keyboard with integrated search features, in accordance with one or more aspects of the present disclosure. The operations of FIG. 7 may be performed by one or more processors of a computing device, such as computing devices 110 of FIG. 1 or computing device 210 of FIG. 2. For purposes of illustration only, FIG. 7 is described below within the context of computing device 110 of FIG. 1.

In operation, computing device 110 may output for display a graphical keyboard comprising a plurality of keys (700). For example, a chat application executing at computing device 110 may invoke keyboard module 122 (e.g., a standalone application or function of computing device 110 that is separate from the chat application) to present graphical keyboard 116B and suggestion regions 118B at PSD 112.

Computing device 110 may determine, based on an indication of a selection of one or more keys from the plurality of keys, inputted text (702). For example, keyboard module 122 may receive information about touch inputs detected at a location of PSD 112 at which graphical keys 118A of graphical keyboard 116B are being displayed. Keyboard module 122 may determine text (e.g., "How about seeing a movie later?") based on the information.

Computer device 110 may determine, based on the inputted text, an information category of the inputted text (704). For example, keyboard module 122 may use local and/or global models to identify and rank entities associated with the inputted text and may select an information category from the highest scoring entities.

Computing device 110 may determine, based on the information category for the inputed text, a graphical symbol associated with the information category (706). For example, keyboard module 122 may execute a query to retrieve, from mapping data (e.g., mapping data 232 of FIG. 2), an indication of a graphical symbol mapped to the determined information category.

Computing device 110 may output, for display within the graphical keyboard, the graphical symbol in a suggestion region of the graphical keyboard (708). For example, if the inputted text is the phrase "wanna grab some food?", keyboard module 122 may determine that the information category for the inputted text is "restaurants" and that the mapped graphical symbol is a knife-and-fork graphical element. Computing device 110 may output, for display, the knife-and-fork graphical element within suggest region 118B.

The following numbered clauses may illustrate one or more aspects of the disclosure:

Clause 1. A method comprising: outputting, by a computing device, for display, a graphical keyboard comprising a plurality of keys; determining, by the computing device, based on an indication of a selection of one or more keys from the plurality of keys, inputted text; determining, by the computing device and based on the inputted text, an information category associated with the inputted text; determining, by the computing device and based on the information category, a graphical symbol associated with the information category; and outputting, by the computing device, for display, the graphical symbol in a suggestion region of the graphical keyboard.

Clause 2. The method of clause 1, further comprising: determining, by the computing device and based on the inputted text, a suggested query; and outputting, by the computing device, for display, the suggested query and the graphical symbol in the suggestion region.

Clause 3. The method of any of clauses 1-2, further comprising: determining, by the computing device and based on the inputted text, a suggested query; and outputting, by the computing device, for display, the suggested query and the graphical symbol in a search region of the graphical keyboard, the search region being different than the suggestion region of the graphical keyboard in which suggested words for text entry are displayed.

Clause 4. The method of clause 3, wherein outputting the suggested query and the graphical symbol comprises replacing, by the computing device, the suggestion region with the search region.

Clause 5. The method of any of clauses 1-4, wherein determining the information category associated with the inputted text comprises: determining, by the computing device, based on at least a portion of the inputted text and one or more of a global model or a local model, a score assigned to the information category indicating a probability that the information category is relevant to the inputted text; and responsive to determining the score assigned to the information category satisfies a threshold, identifying, by the computing device, the information category.

Clause 6. The method of any of clauses 1-5, wherein determining the graphical symbol associated with the information category comprises mapping, by the computing device, the information category to the graphical symbol.

Clause 7. The method of any of clauses 1-6, wherein the information category associated with the inputted text includes a plurality of information categories associated with the inputted text, the method further comprising: determining, by the computing device, for each information category from the plurality of information categories, a respective graphical symbol for the corresponding information category; and outputting, by the computing device, the respective graphical symbols within the suggestion region of the graphical keyboard.

Clause 8. The method of any of clauses 1-7, wherein the information category is determined in response to determining an end of the inputted text, the method further comprising: determining, by the computing device, the end of the inputted text in response to determining that a last key of the selection of one or more keys corresponds to a send key of the graphical keyboard to send the electronic communication.

Clause 9. The method of any of clauses 1-8, wherein the information category is determined in response to determining an end of the inputted text, the method further comprising: determining, by the computing device, the end of the inputted text in response to determining that a last key of the selection of one or more keys corresponds to a punctuation key associated with a punctuation character.

Clause 10. A computing device comprising: a presence-sensitive display component; at least one processor; and a memory storing instructions that, when executed, cause the at least one processor to: output, for display at the presence-sensitive display component, a graphical keyboard comprising a plurality of keys; determine, based on an indication of a selection of one or more keys from the plurality of keys detected at the presence-sensitive display component, inputted text; determine, based on the inputted text, an information category associated with the inputted text; determine, based on the information category, a graphical symbol associated with the information category; and output, for display at the presence-sensitive display component, the graphical symbol in a suggestion region of the graphical keyboard.

Clause 11. The computing device of clause 10, wherein the instructions, when executed, further cause the at least one processor to: determine, based on the inputted text, a suggested query; and output, for display by the presence-sensitive display component, the suggested query and the graphical symbol in the suggestion region of the graphical keyboard.

Clause 12. The computing device of any of clauses 10-11, wherein the instructions, when executed, further cause the at least one processor to: determine, based on the inputted text, a suggested query; and output, for display by the presence-sensitive display component, the suggested query and the graphical symbol in a search region of the graphical keyboard, the search region being different than the suggestion region of the graphical keyboard in which suggested words for text entry are displayed.

Clause 13. The computing device of clause 12, wherein the instructions that cause the at least one processor to output the suggested query and the graphical symbol includes instructions that, when executed, cause the at least one processor to replace the suggestion region with the search region.

Clause 14. The computing device of any of clauses 10-13, wherein the instructions that cause the at least one processor to determine the information category associated with the inputted text includes instructions that, when executed, cause the at least one processor to: determine, based on at least a portion of the inputted text and one or more of a global model or a local model, a score assigned to the information category indicating a probability that the information category is relevant to the inputted text; and responsive to determining the score assigned to the information category satisfies a threshold, identify the information category.

Clause 15. The computing device of any of clauses 10-14, wherein the information category associated with the inputted text includes a plurality of information categories associated with the inputted text, and wherein the instructions, when executed, further cause the at least one processor to: determine, for each information category from the plurality of information categories, a respective graphical symbol for the corresponding information category; and output, for display by the presence-sensitive display component, the respective graphical symbols within the suggestion region of the graphical keyboard.

Clause 16. A non-transitory computer-readable storage medium comprising instructions that when executed cause at least one processor of a computing device to: output, for display, a graphical keyboard comprising a plurality of keys; determine, based on an indication of a selection of one or more keys from the plurality of keys, inputted text; determine, based on the inputted text, an information category associated with the inputted text; determine, based on the information category, a graphical symbol associated with the information category; and output, for display, the graphical symbol in a suggestion region of the graphical keyboard.

Clause 17. The computer-readable storage medium of clause 16, wherein the instructions, when executed, cause the at least one processor of the computing device to: determine, based on the inputted text, a suggested query; and output, for display, the suggested query and the graphical symbol in the suggestion region of the graphical keyboard.

Clause 18. The computer-readable storage medium of any of clauses 16-17, wherein the instructions, when executed, further cause the at least one processor of the computing device to: determine, based on the inputted text, a suggested query; and output, for display by the presence-sensitive display component, the suggested query and the graphical symbol in a search region of the graphical keyboard, the search region being different than the suggestion region of the graphical keyboard in which suggested words for text entry are displayed.

Clause 19. The computer-readable storage medium of clause 18, wherein the instructions, when executed, further cause the at least one processor of the computing device to replace the suggestion region with the search region.

Clause 20. The computer-readable storage medium of any of clauses 16-19, wherein the instructions, when executed, further cause the at least one processor of the computing device to: determine, based on at least a portion of the inputted text and one or more of a global model or a local model, a score assigned to the information category indicating a probability that the information category is relevant to the inputted text; and responsive to determining the score assigned to the information category satisfies a threshold, identify the information category.

Clause 21. A system comprising means for performing any of the methods of clauses 1-9.

Clause 22. A computing device comprising means for performing any of the methods of clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    outputting, by a computing device, for display, a graphical keyboard comprising a plurality of keys;
    determining, by the computing device, based on an indication of a selection of one or more keys from the plurality of keys, inputted text;
    determining, by the computing device and based on the inputted text, an information category associated with the inputted text by at least:
        determining, by the computing device, a current location of the computing device;
        responsive to determining that the current location is different than a location associated with a local model stored by the computing device for predicting information categories associated with inputted text, downloading, from a remote computing system, a different local model associated with the current location for predicting information categories associated with inputted text;
        replacing the local model stored by the computing device with the different local model associated with the current location;
        determining, based on at least a portion of the inputted text and the different local model, a local model score assigned to a local entity or local entity phrase identified from the inputted text; and
        identifying, in response to the local model score assigned to the local entity or the local entity phrase satisfying a threshold, the information category associated with the inputted text;
    determining, by the computing device and based on the information category, a graphical symbol associated with the information category; and outputting, by the computing device, for display, the graphical symbol in at least one of:
  a suggestion region of the graphical keyboard in which suggested words for text entry are displayed; or
  a search region of the graphical keyboard, the search region being different than the suggestion region of the graphical keyboard in which suggested words for text entry are displayed.

2. The method of claim 1, further comprising:
determining, by the computing device and based on the inputted text, a suggested query; and
outputting, by the computing device, for display, the suggested query and the graphical symbol in the suggestion region.

3. The method of claim 1, further comprising:
determining, by the computing device and based on the inputted text, a suggested query; and
outputting, by the computing device, for display, the suggested query and the graphical symbol in the search region of the graphical keyboard, the search region being different than the suggestion region of the graphical keyboard in which suggested words for text entry are displayed.

4. The method of claim 3, wherein outputting the suggested query and the graphical symbol comprises replacing, by the computing device, the suggestion region with the search region.

5. The method of claim 1, wherein determining the information category associated with the inputted text comprises:
determining, by the computing device, based on at least a portion of the inputted text and a global model, a global model score assigned to a global entity or global entity phrase identified from the inputted text, wherein the information category associated with the inputted text is further identified responsive to determining the global model score assigned to the global entity or global entity phrase satisfies the threshold.

6. The method of claim 1, wherein determining the graphical symbol associated with the information category comprises mapping, by the computing device, the information category to the graphical symbol.

7. The method of claim 1, wherein the information category associated with the inputted text includes a plurality of information categories associated with the inputted text, the method further comprising:
determining, by the computing device, for each information category from the plurality of information categories, a respective graphical symbol for the corresponding information category; and
outputting, by the computing device, the respective graphical symbols within the suggestion region of the graphical keyboard.

8. The method of claim 1, wherein the information category is determined in response to determining an end of the inputted text, the method further comprising:
determining, by the computing device, the end of the inputted text in response to determining that a last key of the selection of one or more keys corresponds to a send key of the graphical keyboard to send an electronic communication.

9. The method of claim 1, wherein the information category is determined in response to determining an end of the inputted text, the method further comprising:
determining, by the computing device, the end of the inputted text in response to determining that a last key of the selection of one or more keys corresponds to a punctuation key associated with a punctuation character.

10. The method of claim 1, further comprising:
outputting, by a first application executing at the computing device, a graphical user interface including a text edit region that displays the inputted text as uncommitted text input and an output region that displays committed text input, wherein outputting the graphical keyboard for display comprises:
invoking, by the first application, a keyboard application executing at the computing device,
wherein the keyboard application outputs the graphical keyboard for display adjacent to the text edit region within the graphical user interface of the first application,
wherein the graphic symbol is output for display while the first application continues to output, for display, the graphical user interface including the text edit region that displays the inputted text as uncommitted text input.

11. A computing device comprising:
a presence-sensitive display component;
at least one processor; and
a memory storing instructions that, when executed, cause the at least one processor to:
  output, for display at the presence-sensitive display component, a graphical keyboard comprising a plurality of keys;
  determine, based on an indication of a selection of one or more keys from the plurality of keys detected at the presence-sensitive display component, inputted text;
  determine, based on the inputted text, an information category associated with the inputted text by at least:
    determining a current location of the computing device;
    responsive to determining that the current location is different than a location associated with a local model stored by the computing device for predicting information categories associated with inputted text, downloading, from a remote computing system, a different local model associated with the current location for predicting information categories associated with inputted text;
    replacing the local model stored by the computing device with the different local model associated with the current location;
    determining, based on at least a portion of the inputted text and the different local model, a local model score assigned to a local entity or local entity phrase identified from the inputted text; and
    identifying, in response to the local model score assigned to the local entity or the local entity phrase satisfying a threshold, the information category associated with the inputted text;
  determine, based on the information category, a graphical symbol associated with the information category; and
  output, for display at the presence-sensitive display component, the graphical symbol in at least one of:
    a suggestion region of the graphical keyboard in which suggested words for text entry are displayed; or
    a search region of the graphical keyboard, the search region being different than the suggestion region of the graphical keyboard in which suggested words for text entry are displayed.

12. The computing device of claim 11, wherein the instructions, when executed, further cause the at least one processor to:
   determine, based on the inputted text, a suggested query; and
   output, for display by the presence-sensitive display component, the suggested query and the graphical symbol in the suggestion region of the graphical keyboard.

13. The computing device of claim 11, wherein the instructions, when executed, further cause the at least one processor to:
   determine, based on the inputted text, a suggested query; and
   output, for display by the presence-sensitive display component, the suggested query and the graphical symbol in the search region of the graphical keyboard.

14. The computing device of claim 13, wherein the instructions that cause the at least one processor to output the suggested query and the graphical symbol includes instructions that, when executed, cause the at least one processor to replace the suggestion region with the search region.

15. The computing device of claim 11, wherein the instructions that cause the at least one processor to determine the information category associated with the inputted text includes instructions that, when executed, cause the at least one processor to:
   determine, based on at least a portion of the inputted text and a global model, a global model score assigned to a global entity or global entity phrase identified from the inputted text; and
   identify the information category associated with the inputted text further responsive to determining the score assigned to the global entity or global entity phrase satisfies the threshold.

16. The computing device of claim 11, wherein the information category associated with the inputted text includes a plurality of information categories associated with the inputted text, and wherein the instructions, when executed, further cause the at least one processor to:
   determine, for each information category from the plurality of information categories, a respective graphical symbol for the corresponding information category; and
   output, for display by the presence-sensitive display component, the respective graphical symbols within the suggestion region of the graphical keyboard.

17. A non-transitory computer-readable storage medium comprising instructions that when executed cause at least one processor of a computing device to:
   output, for display, a graphical user interface of a first application executing at the computing device, the graphical user interface including a text edit region that displays uncommitted text input, and an output region that displays committed text input;
   invoke a keyboard application executing at the computing device to output, for display adjacent to the text edit region of the graphical user interface, a graphical keyboard comprising a plurality of keys;
   determine, based on an indication of a selection of one or more keys from the plurality of keys, inputted text;
   determine, based on the inputted text, an information category associated with the inputted text by at least:
      determining a current location of the computing device;
      responsive to determining that the current location is different than a location associated with a local model stored by the computing device for predicting information categories associated with inputted text, downloading, from a remote computing system, a different local model associated with the current location for predicting information categories associated with inputted text;
      replacing the local model stored by the computing device with the different local model associated with the current location;
      determining, based on at least a portion of the inputted text and the different local model, a local model score assigned to a local entity or local entity phrase identified from the inputted text; and
      identifying, in response to the local model score assigned to the local entity or the local entity phrase satisfying a threshold, the information category associated with the inputted text;
   determine, based on the information category, a graphical symbol associated with the information category; and
   output, for display, the graphical symbol in at least one of:
      a suggestion region of the graphical keyboard in which suggested words for text entry are displayed; or
      a search region of the graphical keyboard, the search region being different than the suggestion region of the graphical keyboard in which suggested words for text entry are displayed.

18. The computer-readable storage medium of claim 17, wherein the instructions, when executed, cause the at least one processor of the computing device to:
   determine, based on the inputted text, a suggested query; and
   output, for display, the suggested query and the graphical symbol in the suggestion region of the graphical keyboard.

19. The computer-readable storage medium of claim 17, wherein the instructions, when executed, further cause the at least one processor of the computing device to:
   determine, based on the inputted text, a suggested query; and
   output, for display by the presence-sensitive display component, the suggested query and the graphical symbol in the search region of the graphical keyboard.

* * * * *